United States Patent [19]
Taniyama

[11] Patent Number: 5,546,376
[45] Date of Patent: Aug. 13, 1996

[54] SHUTTER LOCKING MECHANISM FOR A MINIATURE COMPACT DISK CARTRIDGE OR THE LIKE AND A METHOD OF MANUFACTURING THE SAME

[76] Inventor: Yoshihiko Taniyama, 9380 Old Southwick Pass, Alpharetta, Ga. 30202

[21] Appl. No.: 316,880

[22] Filed: Oct. 3, 1994

[51] Int. Cl.⁶ .................................................. G11B 23/03
[52] U.S. Cl. ........................................ 369/291; 360/133
[58] Field of Search ................................ 264/241, 328.1; 369/291; 360/132, 133; 425/577; 206/308.1, 308.3

[56] References Cited

U.S. PATENT DOCUMENTS

| | | | |
|---|---|---|---|
| 3,861,611 | 1/1975 | Esashi et al. | 242/55.19 A |
| 4,463,849 | 8/1984 | Prusak et al. | 369/291 |
| 4,617,655 | 10/1986 | Aldenhoven | 369/291 |
| 4,888,761 | 12/1989 | Ohta | 369/291 |
| 4,943,880 | 7/1990 | Muehlhansen et al. | 360/133 |
| 4,945,530 | 7/1990 | Sandell et al. | 369/291 |
| 5,004,180 | 4/1991 | Okamura et al. | 242/198 |
| 5,073,889 | 12/1991 | Rayner | 369/291 |
| 5,084,861 | 1/1992 | Takahashi | 369/291 |
| 5,208,802 | 5/1993 | Suzuki et al. | 360/133 |
| 5,247,417 | 9/1993 | Ambur et al. | 360/133 |
| 5,280,403 | 1/1994 | Martin | 360/133 |
| 5,280,467 | 1/1994 | Wanger et al. | 369/275.5 |
| 5,289,457 | 2/1994 | Akiyama | 369/291 |
| 5,323,382 | 6/1994 | Takahashi | 369/291 |
| 5,422,774 | 6/1995 | Ommori et al. | 360/132 |
| 5,425,629 | 6/1995 | Taniyama | 425/549 |

*Primary Examiner*—John H. Wolff
*Assistant Examiner*—Paul J. Ditmyer
*Attorney, Agent, or Firm*—Troutman Sanders LLP; Joel S. Goldman; John A. Savio, III

[57] ABSTRACT

A protective cartridge for housing an information storage disk and a method for making the same is provided. Specifically, a shutter-lock adapted to lock a read/write shutter into a closed position is integrally formed with a shell which forms the cartridge. The shutter-lock is molded with the lower shell so as to form a unitary piece consisting of the shutter-lock and the cartridge shell. A method for manufacturing the protective cartridge having the shutter-lock formed integrally therewith is also provided.

10 Claims, 5 Drawing Sheets

SHUTTER LOCKING MECHANISM FOR A MINIATURE COMPACT DISK CARTRIDGE OR THE LIKE AND A METHOD OF MANUFACTURING THE SAME

BACKGROUND OF THE INVENTION

1. Technical Field

The present invention relates generally to an article of manufacture, and more particularly, to a miniature compact disk cartridge ("mini-disk cartridge"), or the like, having an improved shutter locking mechanism.

2. Description of the Prior Art

In recent years, different types of media have been developed for storing digital and analog data. Examples of this type of media include: floppy disks having magnetic media within a flexible shell; floppy disk cartridges having magnetic media within a relatively rigid shell, and having a sliding shutter for protecting the surface of the magnetic media; compact optical mini-disk cartridges having an optical disk within a relatively rigid shell, and having a sliding shutter for protecting the surface of the optical disk; as well as many other types. Normally, a user loads these media into a read/write device for reading information from or writing information to the media device.

In the case of mini-disk cartridges, a mechanism within the outer shell maintains the shutter in either an open or closed locked position, depending upon whether the mini-disk cartridge is being used. For example, in order to protect the underlying magnetic, optical or other type of media, it is often beneficial to maintain the shutter in a closed position when the mini-disk cartridge is not loaded into a reading/writing device. This prevents a user's fingers or other material from entering into the internal portion of the mini-disk cartridge and potentially damaging the media. When the mini-disk cartridge is loaded into the reading/writing device, the reading/writing device may "unlock" the mini-disk cartridge, thereby allowing the shutter to be opened, and the media to be accessed.

FIGS. 1 and 2A–2C depict a mini-disk cartridge 1' having a conventional shutter locking mechanism. Referring to FIG. 1, mini-disk cartridge 1' includes a lower shell 5' and an upper shell 15'. Lower shell 5' includes various fastening bosses 45' located in corners thereof which correspond to similar bosses on an inside portion of upper shell 15'. Lower shell 5' also includes a read/write port 100' which allows a read/write device (not shown) to read information from or write information to a media disk 10' during an access phase. Additionally, lower shell 5' includes a drive port 30' which allows a read/write device to rotate disk 10' during an access phase.

During assembly of the mini-disk cartridge 1', disk 10' may be placed on top of the lower shell 5', a shutter-locking device 25' may be rotatably mounted on mounting boss 20', and upper shell 15' may be interlocked with and ultrasonically welded to the lower shell 5' using fastening bosses 45' located in corners of lower shell 5' so as to sandwich the disk 10' and shutter-lock 25' therebetween.

Mini-disk cartridge 1' also includes a sliding shutter 70' having a cover portion 75' for covering read/write port 100' when the cartridge 1' is not being used by a read/write device. Shutter 70' is slidably coupled to the lower shell 5' on a guide track 81'. Shutter 70' also includes a track grip 80' which has gripping tabs 82' for slidably gripping track 81' on lower shell 5'.

As illustrated in FIGS. 1 and 2A–2C, shutter-lock 25' is adapted to be rotatably mounted on boss 20' through bore 35'. Shutter-lock 25' includes a spring arm portion 40' which resiliently engages a stop 44' disposed on an inside surface of lower shell 5'. Shutter-lock 25' also includes a relatively stiff, thicker portion 50' which contains a recess 55' having a wall 52' and a hooked catch 60' opposite cam 52'. Shutter-lock 25' also includes a ramped portion 65' at a right hand side of an outer portion thereof.

FIGS. 2A–2C illustrate a sequence of positions of shutter 70' progressing from an open position in FIG. 2A through a position where tab 85' is contacting ramp 65' on shutter-lock 25' in FIG. 2B, and finally into a locked, closed position in FIG. 2C. Referring to FIG. 2A, a motion device from a read/write device may engage any outer portion of the shutter 70' such as recess 83 and move the shutter into an open position at its right-most end of travel, fully exposing read/write port 100'. When a user selects a function on the read/write device which ejects mini-disk cartridge 1', the motion device begins to translate shutter 70' in a leftward direction along track 81'. As shown in FIG. 2B, as the shutter 70' moves leftward, tab 85 engages ramp 65' and begins to rotate hooked catch 60' about mounting boss 20' against the spring bias of spring arm 40' and toward stop 44'. Finally, as shown in FIG. 2C, when the tab 85' clears a left-most portion of ramp 65', tab 85' also clears hooked catch 60' and fits within recess 55' when the shutter-lock rotates away from stop 44' from the bias of spring arm 40'. In the position illustrated in FIG. 2C, the shutter 70' is then locked into a closed position since cam 52' and hooked catch 60' rotate counter-clockwise with respect to spring arm 40' and lock tab 85' therebetween.

Finally, the shutter 70' may unlock the read/write device by engaging portion 50' with a pin-like device 110'. When a user inserts the mini-disk cartridge 1' into the read/write device, pin 110' rotates thickened portion 50' clockwise against the bias of spring arm 40' so as to clear tab 85'. A separate motion device within the read/write device then engages recess 83' and moves shutter 70' to an open position.

During the process of manufacturing the mini-disk cartridge of the prior art, automated machinery places shutter-lock 25' onto boss 20' of shell 5'. Several problems are associated with the placement of shutter-lock 25' onto boss 20'. Since shutter-lock 25' swings relatively freely about boss 20' and is an extremely small plastic part, it is difficult to keep shutter-lock 25' on boss 20' during the manufacturing process. Manufacturing machinery often vibrates shutter-lock 25' off of boss 20'. Furthermore, movement between manufacturing stations may also jar the lower shell, possibly causing the shutter-lock 25' to dismount from boss 20'.

Applicant's previous solution attempts to prevent the shutter-lock from dismounting from its mounting boss in a mini-compact disk cartridge. There, the mounting boss is split longitudinally. When the shutter-lock is placed onto the mounting boss, longitudinal halves of the mounting boss resiliently and radially engage the shutter-lock's mounting bore.

Although Applicant's previous attempted solution provides for adequate stability once the shutter lock has been placed onto the mounting boss, problems still remain in placing the shutter-lock onto the mounting boss. For example, during an automated manufacturing process, such as the one utilized to assemble a mini-disk cartridge, there exists little room for variation in the exact placement of the shutter-lock onto the mounting boss. Thus, if the lower shell becomes misaligned with respect to a machine which places the shutter-lock onto the mounting boss, or if the same machine begins to err in the placement of the shutter-lock onto the mounting boss, then the shutter-lock may be misaligned or partially mounted onto the mounting boss. Additionally, the shutter-lock may not mount onto the mounting boss and may lay on an inner surface of the lower shell. Therefore, even if the mounting boss is split, manufacturing problems may still exist regarding shutter-lock mounting procedures.

If, during the manufacturing process which assembles the mini-disk cartridge, the shutter-lock is misaligned, only partially mounted with respect to the mounting boss, or is lying on an inside surface of the lower shell, the shutter will not operate properly and damage to other internal components of the mini-disk cartridge may occur upon further assembly.

SUMMARY OF THE INVENTION

Accordingly, it is an object of the present invention to eliminate problems associated with mounting a small, lightweight piece, such as a shutter-lock, onto a lower shell of a mini-disk cartridge.

Another object of the invention is to mold a lower shell of a mini-disk cartridge which includes a resilient shutter-lock as an integral portion thereof, such that a lower shell and shutter-lock of a mini-disk cartridge are molded as a single piece.

Still another object of the invention is to provide a mold design which allows for a moveable core to facilitate molding of a resilient shutter-lock as a unitary piece with a lower shell of a mini-disk cartridge, or the like.

Generally, the invention relates to a protective cartridge for housing an information storage disk and a method for making the same.

More specifically, the cartridge according to the present invention includes a protective shell adapted to enclose a media disk and at least one read/write port incorporated into the shell for allowing a read/write device access to the disk. A shutter is slidably coupled to the shell and is adapted to cover the read/write port when the cartridge is not in use. Finally, a shutter-lock is integrally formed with the shell and is adapted to lock the shutter into a closed position when the cartridge is not in use.

The protective shell for enclosing the disk also includes an upper shell half and a lower shell half adapted to interlock with each other and enclose the disk. Each shell half may include a read/write port, however, in the preferred embodiment of the present invention, only the lower shell half includes a read/write port. Additionally, the shutter-lock mechanism is molded with the lower shell so as to form a unitary piece consisting of the shutter-lock and the lower shell.

The shutter-lock according to the present invention is substantially U-shaped and includes first and second elongated portions. The first elongated portion of the shutter-lock has a greater width, mass, and therefore stiffness than the second elongated portion. The shutter-lock also includes a third portion which couples the second, more flexible elongated portion of the shutter-lock to the lower shell. The upper and lower shell halves also include arcuate guide walls disposed on inside surfaces thereof for centering the disk within the cartridge. The third portion of the shutter-lock is integrally formed with an arcuate guide wall of the lower shell, so as to connect the shutter-lock to the lower shell.

The shutter also includes a tab adapted to interlock with the shutter-lock when the shutter is in a closed position. Specifically, when the shutter moves from an open position to a closed position, the tab interlocks with a recess disposed on the first elongated portion of the shutter-lock, thereby preventing lateral movement of the shutter when the shutter is in a closed position.

The present invention also relates to a method of manufacturing a protective cartridge for housing an information storage disk. Steps for manufacturing cartridge include molding the upper and lower shell halves and assembling various pieces for the cartridge together. Steps for molding an upper shell of the cartridge include: providing a mold adapted to form the upper shell half of the cartridge, injection molding an upper shell half, and ejecting the upper shell from the upper shell mold.

Additional steps in the manufacturing process include providing a mold adapted to form a lower shell half of the cartridge, and inserting a moveable core into a lower shell of the mold cavity. The core has planar top and bottom surfaces, and is adapted to form a portion of an inside surface of the lower shell and a bottom surface of the shutter-lock. After the moveable core is inserted into the lower shell mold cavity, molten plastic material is then injected into the cavity. Further steps include removing the moveable core from the cavity after the molten plastic material has hardened, and ejecting the lower shell from the cavity. Final steps of the manufacturing process include placing the disk on the lower shell, fastening the upper and lower shells together, thereby housing the disk therebetween, and slidably fastening the shutter onto the cartridge.

Other objects, features, and aspects of the present invention are discussed in greater detail below.

BRIEF DESCRIPTION OF THE DRAWINGS

The accompanying drawings illustrate the preferred embodiment of the invention, and serve to aid in the explanation of the principles of the invention.

DETAILED DESCRIPTION OF THE INVENTION

Figure 1:
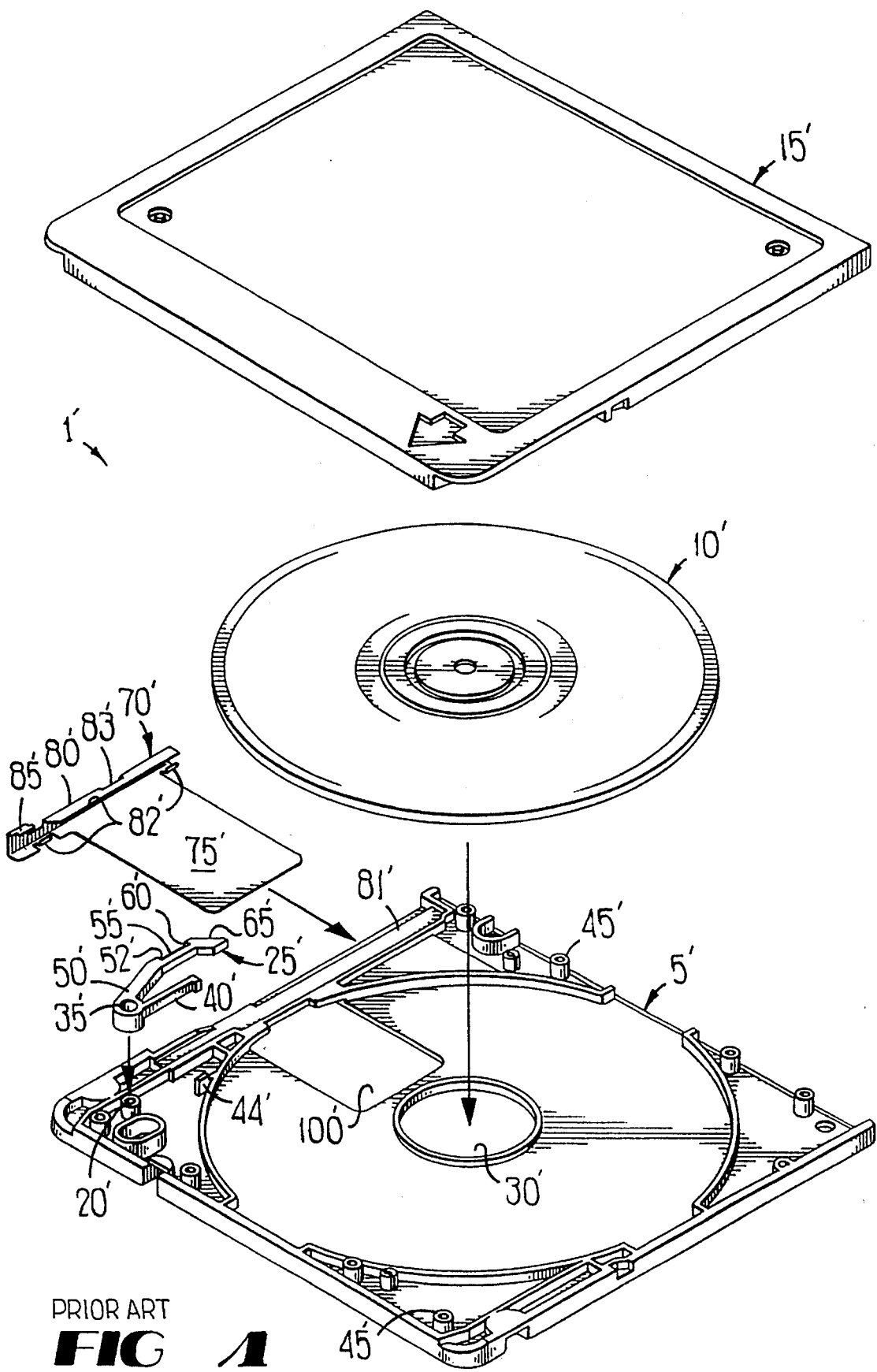
FIG. 1 illustrates an exploded view of a prior art mini-compact disk cartridge having a shutter-lock rotatably mounted to a lower shell thereof.
Figure 2A:
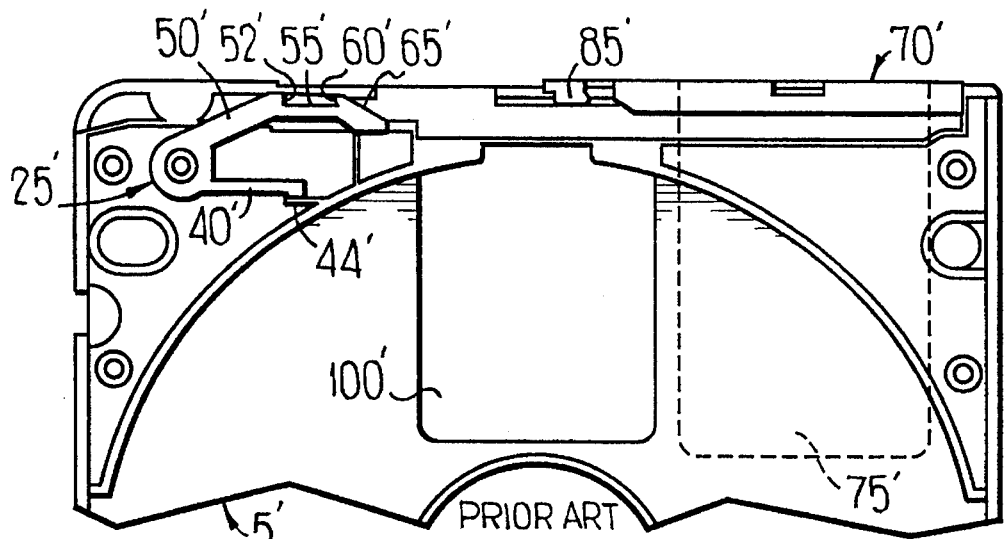
FIGS. 2A, 2B, and 2C illustrate an inside plan view of a lower shell of a prior art mini-disk cartridge illustrating a rotatably mounted shutter-lock interacting with a shutter in an open position, a middle position, and a closed position.
Figure 2B:
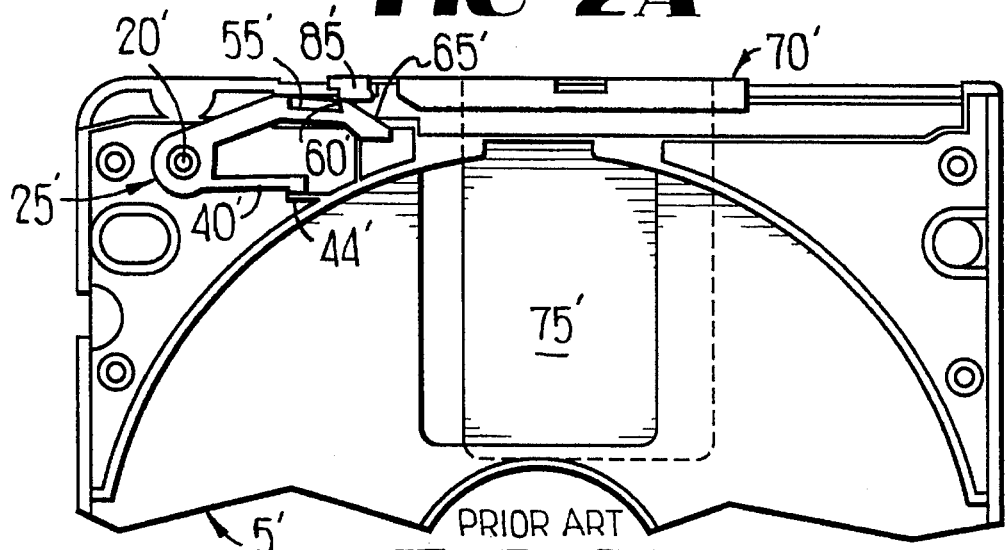
Figure 2C:
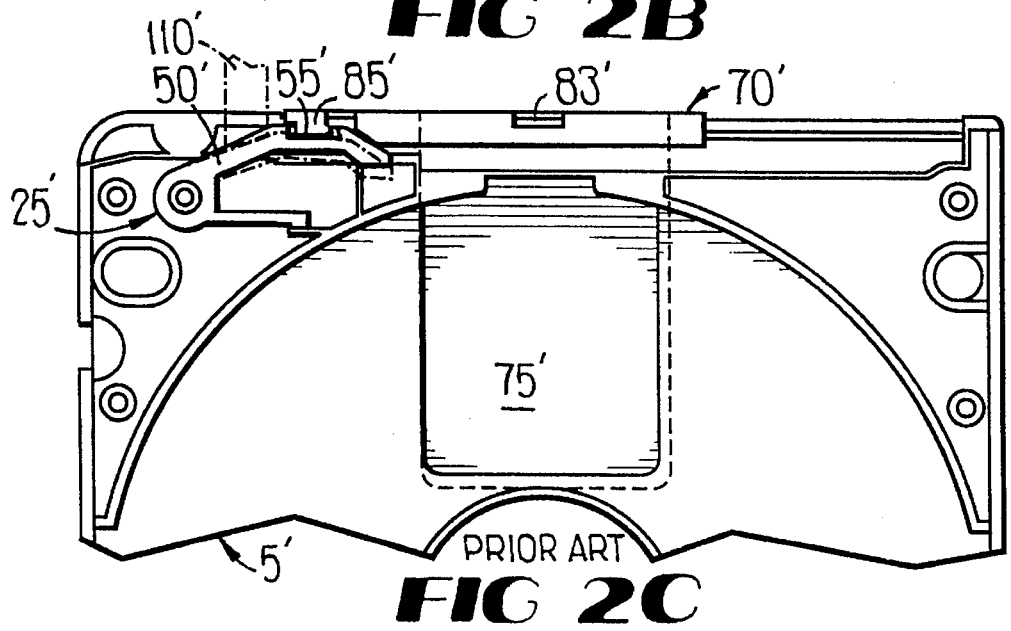
Figure 3:
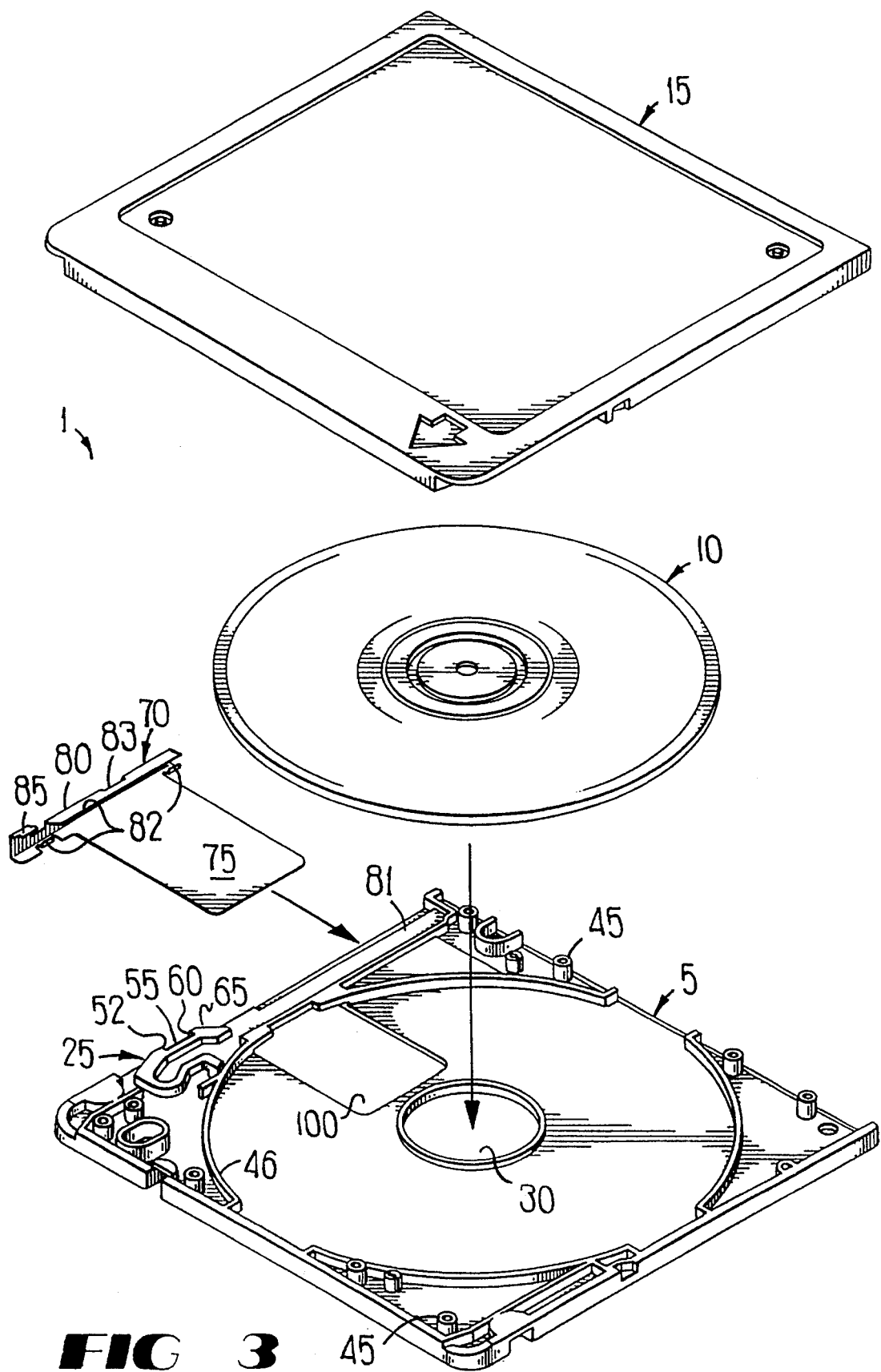
FIG. 3 illustrates an exploded view of a mini-compact disk cartridge according to the present invention having a shutter-lock formed integrally with the lower shell.

FIG. 3 illustrates an exploded, perspective view of a mini-disk a cartridge 1 according to the present invention. A protective shell which houses disk 10 is comprised of lower shell 5 and upper shell 15. The lower shell 5 is a plastic, injection-molded piece, preferably formed from polypropylene or any other plastic material suitable for injection molding. A read/write port 100 for accessing disk 10 is disposed near an edge of an inner surface of the lower shell 5. A drive port 30 is also incorporated into a center portion of the shell for allowing an external device (not shown) to drive the disk. On an inner surface of the lower shell 5, arcuate guide walls 46 are centered around the drive port 30 and form a substantially circular guide for the disk 10. On edges of the lower shell 5, side walls extend from the inner surface 140. Additionally, at each corner fastening bosses 45 are located between the guide walls 46 and the side walls for fastening an upper shell to the lower shell 5 of the mini-disk cartridge. A shutter-lock 25 and is located near one corner of the inner surface of a lower shell 5, in a vicinity of a lower shell edge closest to the read/write port 100.

As seen in FIGS. 3 and 4A–4C, shutter-lock 25 is a small, U-shaped piece adapted to be integrally formed with an arcuate wall 46. Shutter-lock 25 is essentially comprised of four sections. A thickened, relatively stiff, elongated section 50, curved section 56, a thin, elongated section 57, and a connecting section 58 which connects shutter-lock 25 with arcuate wall 46. A dashed line on connecting section 58 indicates a portion of connecting section 58 which is integral with the inside surface of lower' shell 5 and arcuate wall 46. The dashed line also represents a forward-most portion of an inner, movable core which is inserted into a mold cavity adapted to form lower shell 5. The moveable core is adapted to form a bottom surface of shutter-lock 25 an a portion an inside surface of lower shell 5, as will be discussed in greater detail below. Section 50 of shutter-lock 25 includes a recess 55 on an outer portion thereof bordered by wall 52 and hooked catch 60. Additionally, section 50 of shutter-lock 25 includes a ramped portion 65 formed on a remote end thereof.

Figure 4A:
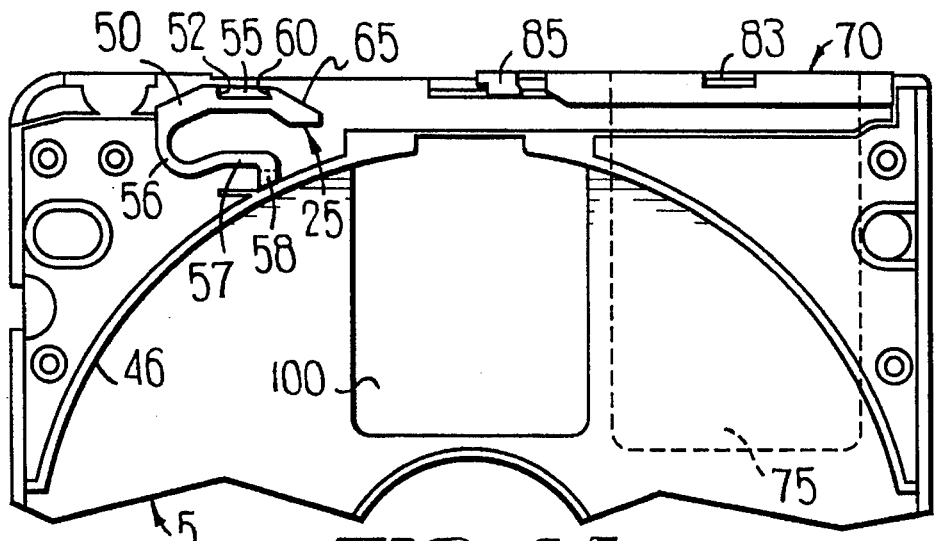
FIGS. 4A, 4B, and 4C illustrate an inside plan view of a lower shell of a mini-disk cartridge according to the present invention illustrating a shutter-lock formed integrally with a lower shell of the mini-disk cartridge and interacting with a shutter in an open position, a middle position, and a closed position.
Figure 4B:
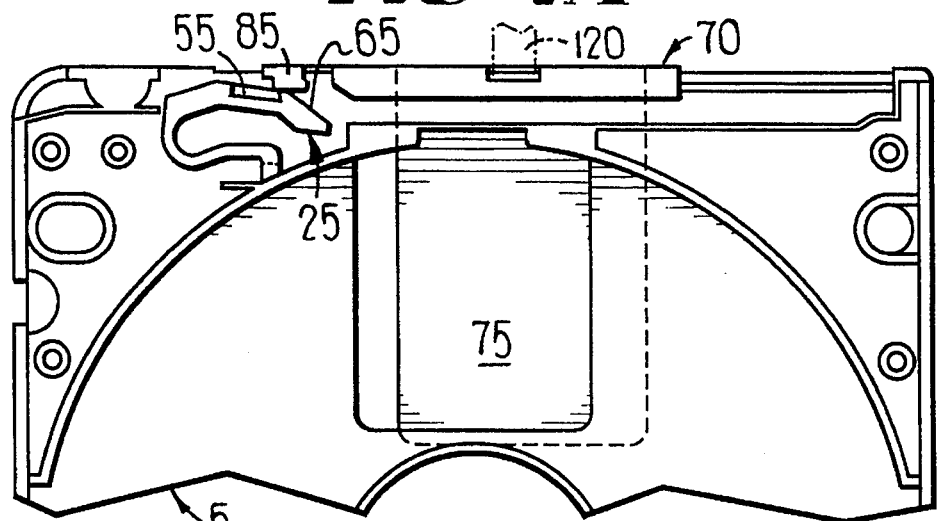
Figure 4C:
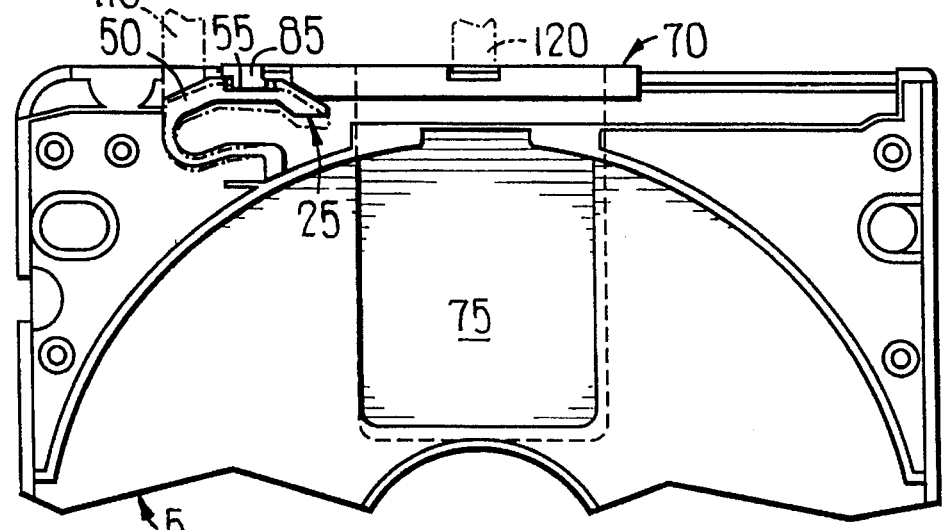

FIGS. 4A–4C illustrate in detail the interrelationship between shutter 70 and the shutter lock 25. FIG. 4A illustrates the shutter 70 in an open position with cover 75 overlapping an outside surface of shell 5, as is shown in dashed lines. Shutter 70 contains a track grip 80 having gripping tabs 82 each of which slidably retain shutter 70 onto guide track 81 of lower shell 5. Additionally, shutter 70 includes tab 85 adapted to matingly engage recess 55 on shutter lock 25. Shutter 70 may be formed from any appropriate sheet metal material, although it may be manufactured from any appropriate plastic material as well. Track grip 80 also includes a recess 83 adapted to receive a protrusion 120 from a read/write device, which moves the shutter from a closed position to an open position so as to gain access to disk 10 within the cartridge.

As seen in FIG. 4B, when the read/write device prepares to eject cartridge 1, protrusion 120 moves shutter 20 leftward. During that leftward motion, tab 85 engages ramp 65 on shutter-lock 25, displacing section 50 inward. As the shutter progresses further leftward, tab 85 clears ramp 65 and recess 55 resiliently engages tab 85 on shutter 70, thereby locking shutter 70 into a closed position. When shutter 70 has been locked into a closed position, the read/write device then ejects cartridge 1.

When the cartridge 1 is inserted into the read/write device, the read/write device unlocks shutter 70, moves shutter 70 so as to expose read/write port 100, and accesses the disk for reading information therefrom or writing information thereto. More specifically, as is seen in FIG. 4C, after the cartridge 1 has been inserted into the read/write device, a protrusion 110 engages portion 50 of shutter-lock 25 through an aperture between upper and lower shells 15 and 5. Protrusion 110 displaces the shutter-lock inward until recess 55 clears tab 85. Protrusion 120 then engages recess 83 of shutter and moves shutter 70 in a rightward motion, thereby exposing read/write port 100 for disk access.

Figure 5A:
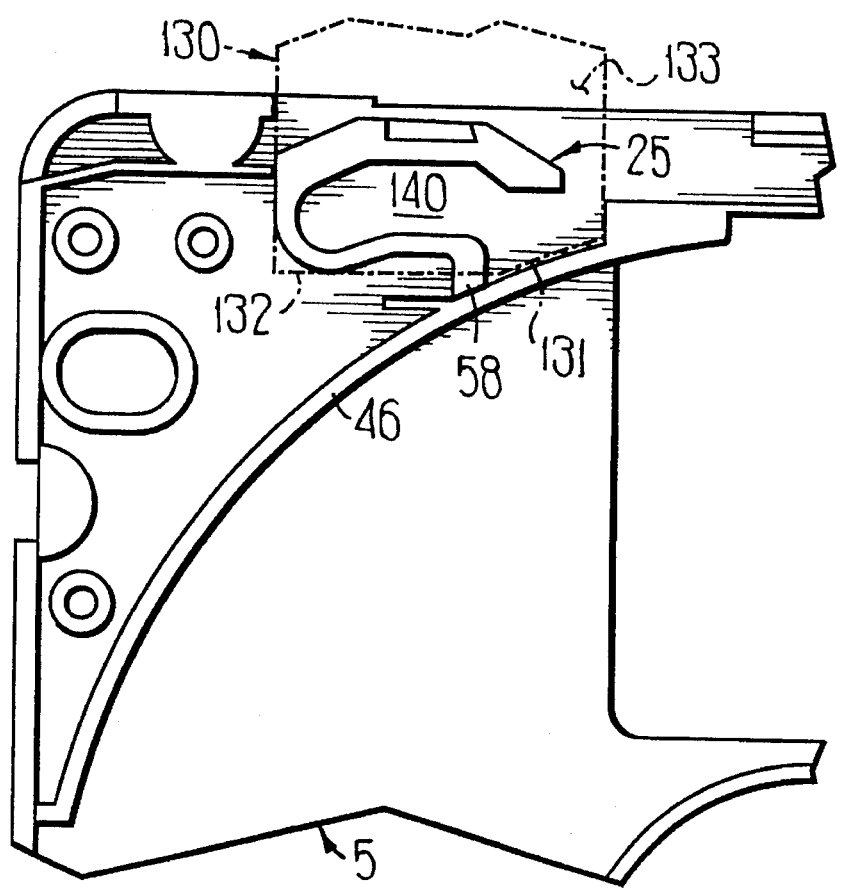
FIG. 5A is an isolated top plan view of the lower shell according to the present invention, illustrating a moveable core which forms a portion of an inside surface the lower shell and a bottom surface of the shutter-lock.
Figure 5B:
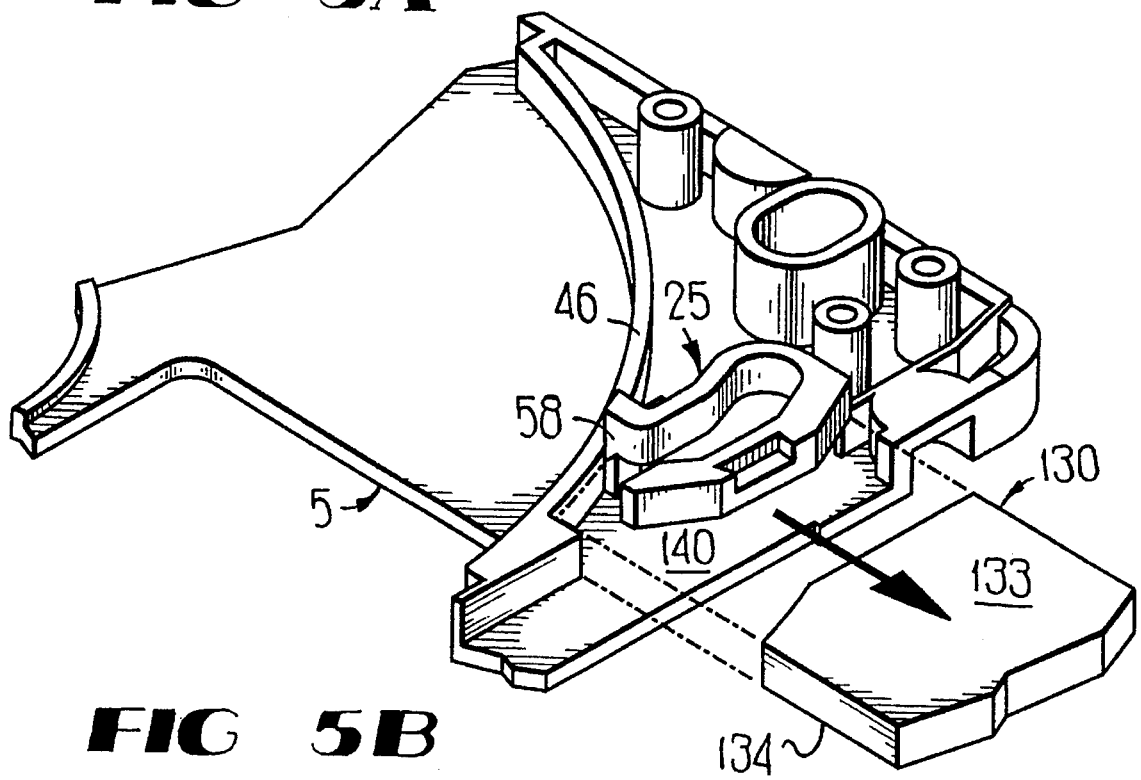
FIG. 5B is an isolated perspective view of the lower shell illustrating removal of the movable core before an ejection phase from the shell mold.

FIGS. 5A and 5B illustrate the location and movement of moveable core 130 during a molding phase of the present invention. A molding technique according to the present invention is adapted to mold the shutter-lock 25 integrally with the lower shell 5 while allowing portions of the shutter-lock to be resiliently displaced by shutter tab 85 and protrusion 110. Specifically, mold structure within the mold cavity must separate portions of a lower surface of the shutter-lock 25 from an inside surface 140 of the lower shell 5 for such shutter-lock movement to be possible. Additionally, the mold structure must allow quick and easy ejection of the shell from the mold cavity when the molten plastic has hardened.

FIG. 5A illustrates moveable core 130 by a dashed line in a fully deployed position within the lower mold cavity. A curved front edge 131 of the core 130 may form a portion of an outer edge of arcuate guide wall 46 near connecting section 58 of shutter-lock 25, while a straight front edge 132 forms a forward most portion of connecting section 58. As seen in FIG. 5B, an upper surface 133 of moveable core 130 forms a lower surface of the shutter-lock 133, and a lower surface 134 of the core forms a portion of inside surface 140 of the lower shell 5. A thickness of the moveable core 130 is exaggerated for the purposes of illustration, and core 130 may be of any thickness sufficient to accomplish its function.

Steps for manufacturing cartridge 1 include molding the upper and lower shell halves 15 and 5 and assembling various pieces for the cartridge together. In manufacturing the upper shell 15, a mold adapted to form the upper shell half 15 of the cartridge is provided. Next, molten plastic is injected into a cavity within the upper shell mold using either hot- or cold-runner injection techniques. Molten plastic within the upper shell cavity is allowed to harden or cure, thereby forming the upper shell for the cartridge 1. Finally, the upper shell is ejected from the upper shell mold.

In manufacturing the lower shell 5, a mold having a cavity adapted to form a lower shell half of the cartridge is provided. Furthermore, the lower shell cavity is adapted to receive moveable core 130 for the purpose of molding shutter-lock as an integral portion of lower shell 5. Prior to injection of molten plastic into the lower shell mold cavity, a molding apparatus inserts moveable core 130 into the lower shell mold cavity to a position as illustrated in FIG. 5A. After the moveable core is inserted into the lower shell mold cavity, the molding apparatus then injects molten plastic material into the cavity via a hot-runner nozzle valve assembly through a valve gate in the mold cavity. Cold-runner pin-point injection may also be used to form the upper or lower shells. After the molten plastic has sufficiently hardened or cured to form the lower shell, the molding apparatus removes the moveable core from the cavity, and ejects the lower shell from the lower shell cavity. The molding apparatus may actuate the core 130 using any known means. These include but are not limited to hydraulic, pneumatic, or solenoid actuation.

Final steps of the manufacturing process include assembly of the mini-disk cartridge 1, in which various components are placed within the lower shell 5. These include but are not limited to a disk 10. After internal components are mounted on lower shell 5, the upper shell of the mini-disk cartridge is placed onto lower shell 5. Fastening bosses 45 of lower shell 5 engage appropriate fastening bosses of the upper shell and are ultrasonically welded together or fastened together by any appropriate means. Shutter 70 may then be slidably coupled or clamped to the guide 81.

It should be understood that various changes to the present invention may be made by the ordinarily skilled artisan, without departing from the spirit and scope of the present invention which is presented in the claims below. For example, the shutter-lock according to the present invention may be used on disk cartridges having shutters which protect read/write ports on both the upper and lower disks. Furthermore, the shutter-lock according to the present invention may be used on cartridges which contain objects of any shape used to store data. These objects may have the shape of a disk or any other object, and may include substrates which record information using optical, magneto-optical, or magnetic means. Moreover, the cartridge shells and shutter-lock may be formed from any type of plastic that is suitable for injection molding purposes.

Furthermore, the ordinarily skilled artisan will understand that this disclosure presents an example of the invention and is not meant to limit the invention, as presented in the claims, in any way whatsoever.

What is claimed is:

1. A protective cartridge for housing an information storage disk comprising:
    a protective shell adapted to enclose the disk;
    at least one read/write port incorporated into said shell for allowing a read/write device access to the disk;
    a shutter slidably coupled to said shell and adapted to move into a closed position to cover said read/write port, and move into an open position to allow access to said read/write port; and
    a shutter-lock integrally formed with said shell and adapted to releasably lock said shutter into the closed position, wherein said shutter-lock includes
        a first elongated portion including first and second ends, means for releasably engaging said shutter into the closed position, and a first stiffness associated with said first elongated portion,
        a second elongated portion including a first end connected to said second end of said first elongated portion, a second end, and a second stiffness associated with said second elongated portion, wherein said second stiffness is substantially less than said first stiffness, and
        a third portion formed on said second end of said second elongated portion of said shutter lock, wherein said third portion of said shutter-lock is integrally formed with said lower shell, wherein said first, second and third portions of said shutter-lock and said shell comprise a single unitary piece, and
    wherein said second portion of said shutter-lock is adapted to bend for allowing said first portion of said shutter-lock to rigidly translate and disengage from said shutter and to allow said shutter to slide into the open position.

2. The cartridge of claim 1 wherein said shell further includes:
    an upper shell half and a lower shell half adapted to interlock with each other and enclose the disk, wherein said lower shell half includes a read/write port.

3. The cartridge of claim 2 wherein said upper and lower shells further include:
    arcuate guide walls disposed on inside surfaces thereof for centering the disk within the cartridge, wherein said third portion of said shutter-lock is integrally formed with said arcuate guide wall of said lower shell.

4. The cartridge of claim 3 wherein said cartridge further comprises:
    a tab disposed on said shutter for interlocking with said shutter-lock when said shutter is in the closed position; and
    wherein said means for releasably engaging said shutter includes a recess disposed on said first elongated portion of said shutter-lock for receiving and engaging said tab, thereby preventing lateral movement of said shutter when said shutter is in the closed position.

5. The cartridge of claim 1 wherein said shutter-lock is substantially U-shaped.

6. A protective cartridge for housing an information storage disk including a shell for enclosing the disk, at least one read/write port incorporated into said shell for allowing a read/write device access to the disk, a shutter slidably disposed over each said read/write port for covering each said read/write port while in a closed position and exposing each said read/write port while in an open position, wherein the improvement comprises:
    a shutter-lock adapted to lock said shutter into a closed position, said shutter-lock including
    a first elongated portion including first and second ends, means for releasably engaging the shutter into the closed position, and a first stiffness associated with said first elongated portion,
    a second elongated portion including a first end connected to said second end of said first elongated portion, a second end, and a second stiffness associated with said second elongated portion, wherein said second stiffness is substantially less than said first stiffness, and
    a third portion formed on said second end of said second elongated portion of said shutter-lock, wherein said third portion of said shutter-lock is integrally formed with said lower shell, and said first, second and third portions of said shutter-lock and said shell comprise a single unitary piece, and
    wherein said second portion of said shutter-lock is adapted to bend for allowing said first portion to rigidly translate and disengage from said shutter and allow said shutter to slide into the open position.

7. The cartridge of claim 6 wherein said shell further includes:
    an upper shell half and a lower shell half adapted to interlock with each other and enclose the disk, and wherein said lower shell half further includes a read/write port.

8. The cartridge of claim 7 wherein said lower shell further includes:
    arcuate guide walls disposed on an inside surface thereof for centering the disk within the cartridge, wherein said third portion of said shutter-lock is integrally formed with said arcuate guide wall.

9. The cartridge of claim 6 wherein said shutter-lock is substantially U-shaped.

10. The cartridge of claim 6 wherein said cartridge further comprises:
    a tab disposed on said shutter for interlocking with said shutter-lock when said shutter is in a closed position; and
    wherein said means for releasably engaging said shutter includes a recess disposed on said first elongated portion of said shutter-lock adapted to engage said tab, thereby preventing lateral movement of said shutter when said, shutter is in a closed position.

* * * * *